United States Patent
Singh et al.

(10) Patent No.: US 11,803,667 B2
(45) Date of Patent: Oct. 31, 2023

(54) OVERLAY OWNERSHIP CERTIFICATES INCLUDING HARDWARE INVENTORY PROFILES

(71) Applicant: DELL PRODUCTS, LP, Round Rock, TX (US)

(72) Inventors: Ankit Singh, Bangalore (IN); Deepaganesh Paulraj, Bangalore (IN); Vaideeswaran Ganesan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 17/225,026

(22) Filed: Apr. 7, 2021

(65) Prior Publication Data

US 2022/0327243 A1 Oct. 13, 2022

(51) Int. Cl.
| | |
|---|---|
| *G06F 21/73* | (2013.01) |
| *G06F 21/64* | (2013.01) |
| *G06F 21/72* | (2013.01) |
| *G06F 9/4401* | (2018.01) |

(52) U.S. Cl.
CPC .......... *G06F 21/73* (2013.01); *G06F 9/4411* (2013.01); *G06F 21/64* (2013.01); *G06F 21/72* (2013.01); *G06F 2221/2129* (2013.01)

(58) Field of Classification Search
CPC ........ G06F 21/73; G06F 9/4411; G06F 21/64; G06F 21/72; G06F 2221/2129; G06F 21/57; G06F 9/4401; G06F 2221/2143
See application file for complete search history.

(56) References Cited

U.S. PATENT DOCUMENTS

| | | | |
|---|---|---|---|
| 10,645,557 B2 | 5/2020 | Robison et al. | |
| 2009/0138699 A1* | 5/2009 | Miyazaki | H04L 63/061 717/170 |
| 2010/0077208 A1* | 3/2010 | Appiah | G06F 21/33 713/158 |
| 2010/0235647 A1* | 9/2010 | Buer | G06F 21/52 717/136 |
| 2019/0354298 A1* | 11/2019 | Öberg | G06F 3/0652 |
| 2020/0234283 A1* | 7/2020 | Greiche | H04L 9/0825 |
| 2021/0297330 A1* | 9/2021 | Li | H04L 41/28 |
| 2022/0207463 A1* | 6/2022 | Young | G06F 21/71 |

* cited by examiner

*Primary Examiner* — Carl G Colin
*Assistant Examiner* — Andrew Suh
(74) *Attorney, Agent, or Firm* — Larson Newman, LLP (57) ABSTRACT

An information handling system includes a provisioning server and a server. The server includes a baseboard management controller (BMC) to determine a first hardware inventory profile for the server. The BMC provides the first hardware inventory profile to the provisioning server. The BMC stores first signed provisioning configuration content that is based on a first ownership certificate for a first owner of the server. The BMC determines a second hardware inventory profile for the server, and provides the second hardware inventory profile to the provisioning server. The BMC stores second signed provisioning configuration content that is based on a second ownership certificate for a second owner of the server. In response to an expiration of the second ownership certificate, the BMC removes the second signed provisioning configuration content, compares a current hardware inventory profile to the first hardware inventory profile, and generates a report to indicate any hardware changes.

16 Claims, 4 Drawing Sheets

OVERLAY OWNERSHIP CERTIFICATES INCLUDING HARDWARE INVENTORY PROFILES

FIELD OF THE DISCLOSURE

The present disclosure generally relates to information handling systems, and more particularly relates to overlay ownership certificates including hardware inventory profiles.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a server having a baseboard management controller (BMC) to determine a first hardware inventory profile for the server. The BMC further may provide the first hardware inventory profile to the provisioning server. The first hardware inventory profile may be included within first provisioning configuration content. The BMC may store first signed provisioning configuration content. The first signed provisioning configuration content may be based on a first ownership certificate for a first owner of the server. The BMC may determine a second hardware inventory profile for the server, and provide the second hardware inventory profile to a provisioning server. The second hardware inventory profile may be included within second provisioning configuration content. The BMC may store second signed provisioning configuration content. The second signed provisioning configuration content may be based on a second ownership certificate for a second owner of the server. In response to an expiration of the second ownership certificate, the BMC may remove the second signed provisioning configuration content, compare a current hardware inventory profile for the server to the first hardware inventory profile, and generate a report to indicate any hardware changes between the current hardware inventory profile and the first hardware inventory profile.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
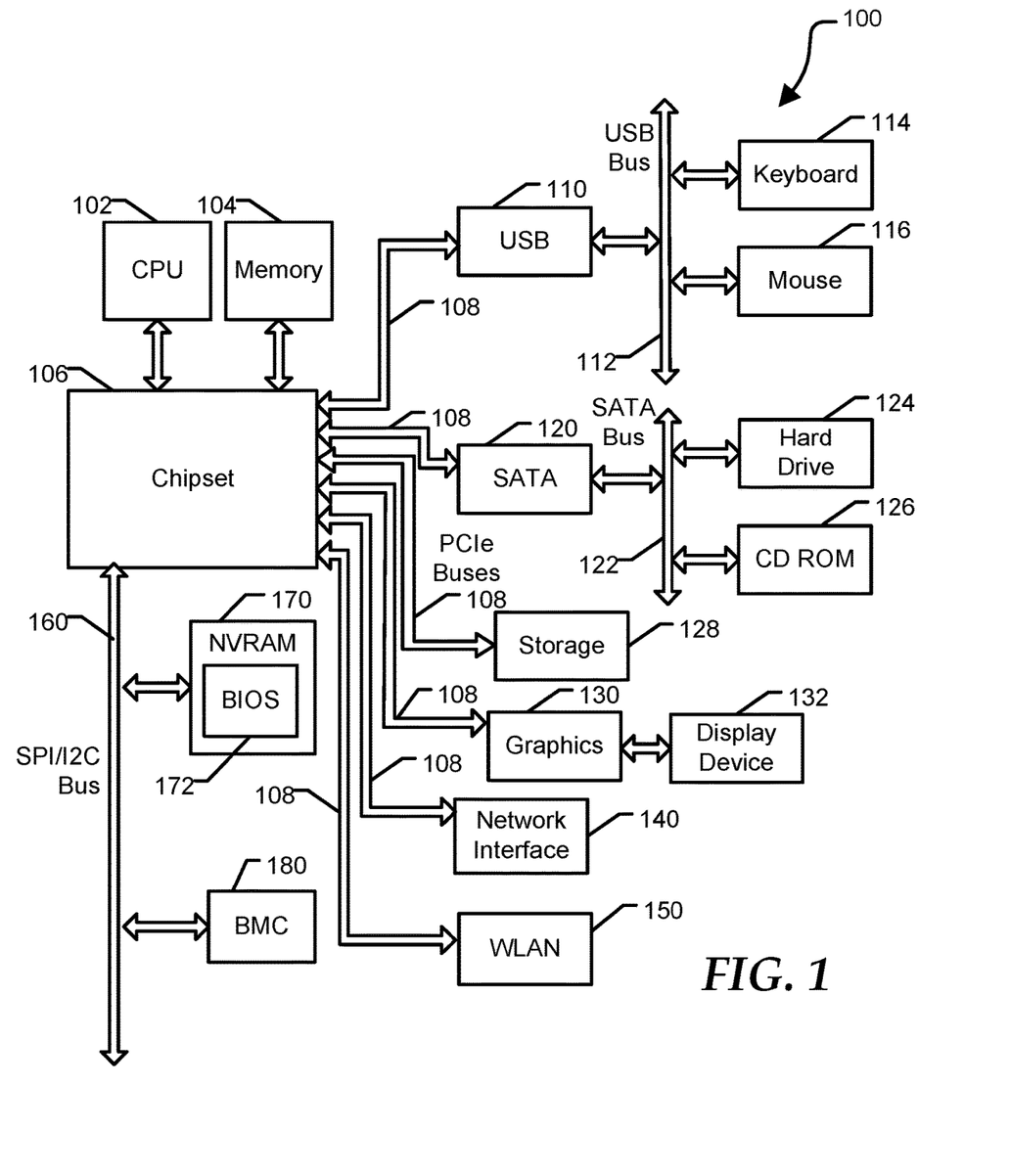
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
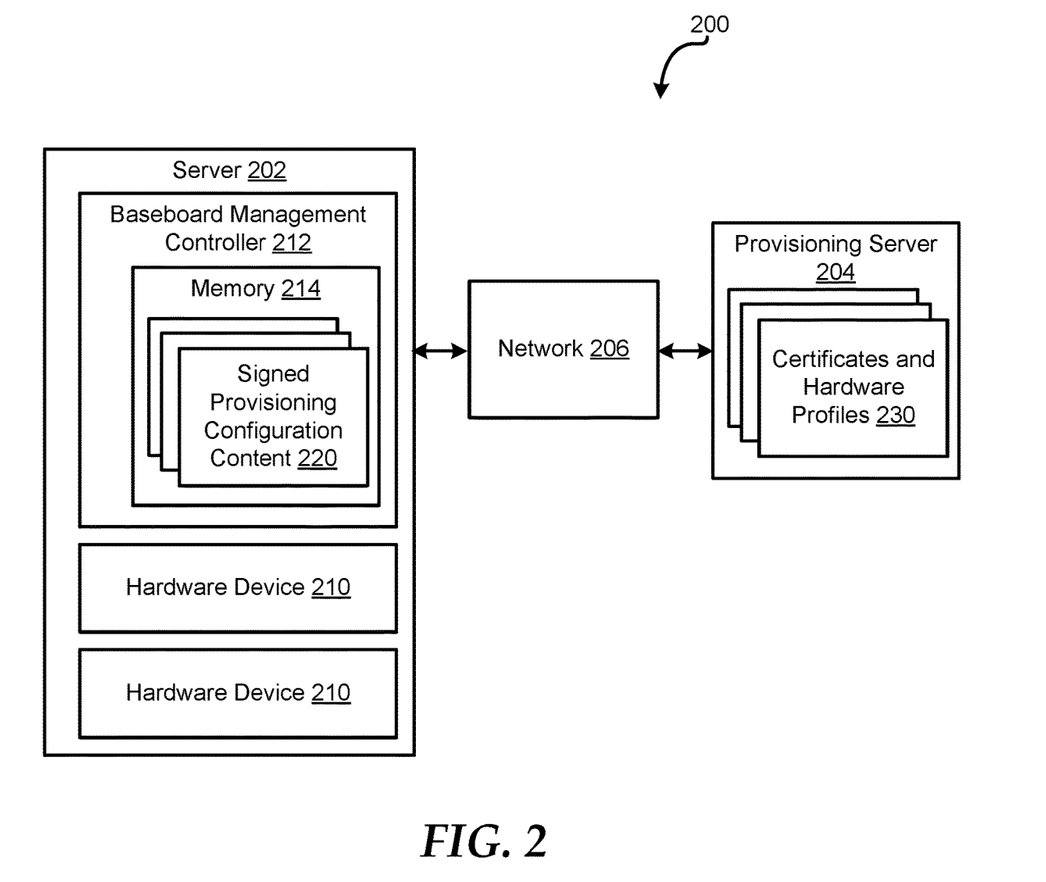
FIG. 2 is a block diagram of an information handling system with a server and a provisioning server according to at least one embodiment of the disclosure.

In an example, information handling system 100 may be any suitable device including, but not limited to, server 202 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates an information handling system 200 including a server 202 and a provisioning server 204 according to at least one embodiment of the disclosure. Server 202 may communicate with provisioning server 204 via a network 206. Server 202 includes one or more hardware devices 210 and a baseboard management controller (BMC) 212, which in turn includes a memory 214. In an example, hardware devices 210 may include any suitable devices of an information handling system including, but not limited to, a CPU, one or more dual inline memory modules (DIMMs), network interface cards (NICs), hard disk drives (HDDs), and solid state drives (SSDs). In certain examples, BMC may be a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like.

In an example, BMC 212 may store any suitable data within memory 214 including, but not limited to, one or more signed provisioning configuration content 220. In certain examples, signed provisioning configuration content 220 may include data to enable an owner of server 202 access to the server. For example, signed provisioning configuration content may include, but is not limited to, an administration username and password associated with an ownership certificate for the owner. In certain examples, signed provisioning configuration content 220 may include a list of hardware device configuration details. In an example, server 202 may include additional components over those shown in FIG. 2 without varying from the scope of this disclosure.

Provisioning server 204 may include one or more owner certificates and hardware inventory profiles 230. In an example, each different owner certificate and hardware inventory profile 230 may be associated with a different owner of server 202. In certain examples, owner certificates and hardware inventory profiles 230 may be stored separately without varying from the scope of this disclosure. In an example, provisioning server 204 may include additional components over those shown in FIG. 2 without varying from the scope of this disclosure.

When an information handling system is utilized for bare-metal as-a-service (BaaS), a bare metal cloud platform may hand over an information handling system or server to an end user and the end user may use the server how they want. Then the bare metal cloud platform may take the server back when the end user is done with it. In previous information handling systems, ownership of the information handling system may be leased or transferred from one owner to a new owner for a period of time. When the lease expired, the previous owner would need to manually reinitiate ownership in the information handling system. Additionally, in previous information handling systems, when ownership is transferred back to the previous owner, the most recent owner may forget to clean up the data on the information handling system, install original hardware devices, or the like. This failure to clean up or remove data before ownership reverts to the previous owner may result in confidential data associated with the most recent owner being exposed to the previous owner. Previous information handling systems also allow a current owner to change administration usernames and passwords, administration privileges, configurations, and customizations of the information handling system. In these previous information handling systems, if the current owner does not reset these changes, the previous owner may not have access to the information handling system through a management interface and may not know whether changes have been made to the hardware devices within the information handling system. Thus, information handling system or server 202 may be improved by providing a system to provide automatic reversion of ownership at the expiration of a current lease, secure erasing of confidential data, reversion to a previous configuration, and report hardware device changes at the end of a leasing period.

During the lifetime of server 202, ownership or use of the server may transfer among multiple owners. For example, a manufacturer may ship server 202, or a storage device, to a hardware-as-a-service (HaaS) vendor, and the HaaS vendor may be a first owner of the server. Next, the HaaS vendor may transfer the ownership of server 202 to a BaaS cloud provider, which may be the second owner of the server. The BaaS cloud provider may lease server 202 to a service provider or end user, which may be a third owner of the server. In this example, each owner may receive ownership of server 202 via a lease for a different amount of time, and the ownership of the server should revert back to the previous owner at the expiration of the lease.

In an example, the HaaS vendor or first owner may be the original owner of server 202, and the BaaS cloud provider may lease the server for a specific amount of time including, but not limited to, two years, five years and ten years. The BaaS cloud provider may transfer ownership of server 202 to the end user or third owner via a sub-lease for a particular amount of time, which may be equal to or less than the amount of time granted to the second owner. For example, the end user or third owner may lease server 202 for an amount of time including, but not limited to, three months, six months, and a year. In response to the sub-lease for the third owner expiring, the ownership of server 202 may automatically revert back to the second owner/BaaS cloud provider. At this point, the second owner/BaaS owner may provide another sub-lease to another owner for an amount of time not exceeding the remaining time on the second owner's lease. When the lease for the second owner expires, the ownership of server 202 may then automatically revert back to the first owner/HaaS vendor, and the entire process may be performed again. The ownership transfer by chaining ownership certificates for server 202 and tracking hardware inventory within the server will be discussed with respect to FIGS. 2 and 3.

Referring to FIG. 2, during manufacturing of server 202, a first certificate, a first public key, and a first private key may be installed into the server. In an example, the first certificate, the first public key, and the first private key may be utilized to automatically apply associated provisioning configuration content when server 202 is powered on. The provisioning configuration content may be automatically applied in any suitable manner including, but not limited to, a zero touch provision. In an example, a zero touch provisioning may result in server 202 being provisioned according to the provisioning configuration without interaction from the owner of the server. In certain examples, the provisioning configuration content may contain any suitable data including, but not limited to, a list of user configurations, administrator username and password, hardware device configuration details, IP address, software configuration details, and firmware update details. The hardware device configuration details may include data associated with hardware devices 210 installed in server 202. For example, the hardware device configuration details may include, but is not limited to, types of hardware devices 210, storage or memory sizes for the hardware devices, processing capability of the hardware devices, and serial numbers of the hardware devices. In an example, the ownership certificate, public and private keys, and provisioning configuration content may be generated in any suitable format, such as XML/JSON format.

Figure 3:
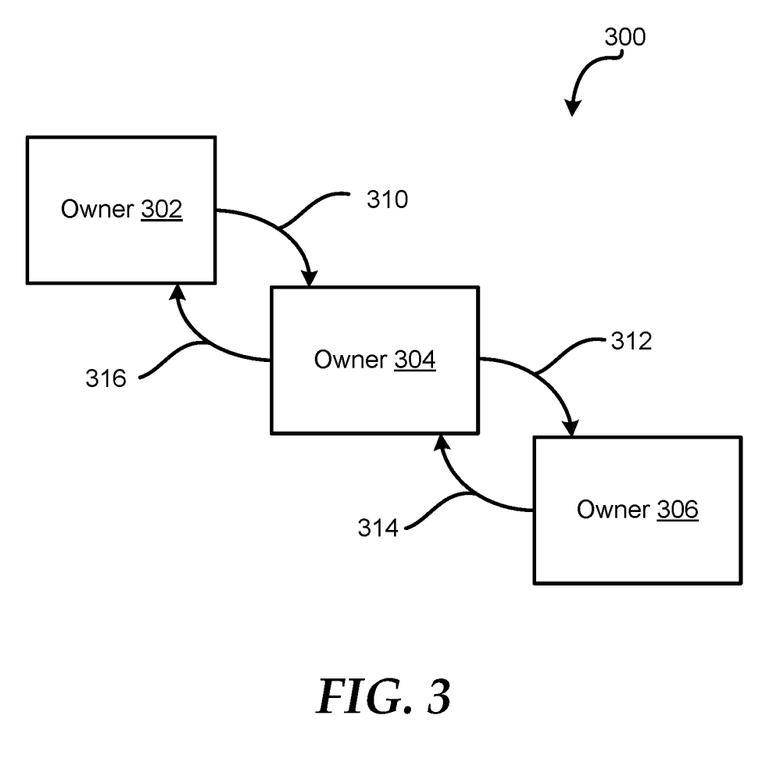
FIG. 3 is a diagram of transitions between different owners of an information handling system according to at least one embodiment of the disclosure.

Referring now to FIG. 3, a sequence 300 of ownership transfers is illustrated according to at least one embodiment of the disclosure. The sequence 300 may transition among owners 302, 304, and 306. For brevity and clarity, the ownership transfers are discussed with respect to owners 302, 304, and 306. However, one of ordinary skill in the art would recognize that sequence 300 may include ownership transfers for any number of owners without varying from the scope of this disclosure.

Referring to both FIGS. 2 and 3, owner 302 may register ownership of server 202 by configuring an ownership certificate and hardware inventory profile 230 within provisioning server 204. In an example, the configuration information for the ownership certificate may be provided to provisioning server 204 via any suitable means including, but not limited to, an encrypted communication over network 206. BMC 212 may export a current server profile to provisioning server 204, and may update required configuration data for server 202. For example, owner 302 may utilize baseboard management controller 210 to update an administrator username and an administrator password. In an example, the configuration data may also be included within server 202 during shipment of the server, within owner hardware and software inventory configuration content. The owner hardware configuration content may include the hardware inventory of server 202 including hardware devices 210.

BMC 212 may utilize the first private key of the first certificate and hardware inventory profile 230 to provision configuration content in any suitable format, such as XML/JSON format, and export the configuration content including the hardware inventory profile to provisioning server 204. In response to the provisioning content being received at provisioning server 204, a processor, such as CPU 102 of FIG. 1, within the provisioning server may determine whether the provisioning content is valid. In an example, the provisioning server 204 may determine if the provisioning content is valid based on the public key provided from BMC 212. For example, provisioning server 204 may authenticate a received public key based on a private key associated with the first certificate and stored within a memory of the provisioning server. In response to the provisioning content being validated, provisioning server 204 may return signed provisioning configuration content to BMC 212.

BMC 212 may store signed provisioning configuration content 220 within memory 214. In an example, memory 214 may be any suitable encrypted memory including, but not limited to, a credential vault memory or memory location. In response to the signed provisioning configuration content 220 associated with owner 302 being stored in memory 214, the owner may utilize the administrator username and password to perform operations within server 202, to change configurations of the server, or the like.

In an example, one or more suitable operations may be performed to lease server 202 to a second owner, such as owner 304 in FIG. 3. In this example, owner 302 may utilize BMC 212 and provisioning server 204 to perform an ownership transfer 310 to owner 304. BMC 212 may initiate ownership transfer 310 by providing transfer data to provisioning server 204. In an example, the transfer data may be any suitable data including, but not limited to, a username and password for second owner 304, and updated configuration data for server 202 associated with the second owner. BMC 212 may also provide a signed ownership transfer certificate to provisioning server 204 along with the other transfer data.

In certain examples, after owner 302 utilizes BMC 212 to initiate ownership transfer 310 via the signed ownership transfer certificate, owner 304 may access BMC 212 to register ownership of server 202. In an example, BMC 212 may configure the ownership certificate and hardware inventory profile 230 associated with owner 304 within provisioning server 204. BMC 212 may also provide a countersigned ownership transfer certificate associated with ownership transfer 310 to provisioning server 204. Owner 304, via BMC 212, may request a second ownership certificate and hardware inventory profile 230, a second public key, a second private key, and second provisioning configuration content based on any suitable operations. For example, BMC 212 may provide the first ownership certificate and first public key both of which are associated with the first or current owner 302.

Based on ownership transfer 310 of server 202 to new owner 304, BMC 212 may export a current server profile to provisioning server 204, and may update required configuration data for server 202. For example, owner 304 may utilize baseboard management controller 210 to update an administrator username, an administrator password, and other hardware and software inventory and configurations.

In an example, owner 304 may customize hardware devices 210 within server 202. For example, owner 304 may replace one or more hardware devices 210, may remove one or more of the hardware devices, add additional hardware devices, or the like. BMC 212 may detect the one or more hardware changes within server 202. In response to hardware changes being detected, BMC 212 may provide the hardware configuration profile to provisioning server 204, which in turn may save the hardware configuration as hardware inventory profile 230 for owner 304.

BMC 212 may utilize the second private key of the second certificate and hardware inventory profile 230 to convert the provision configuration content with the hardware inventory in any suitable format, such as XML/JSON format, and export the configuration content to provisioning server 204. In response to the second provisioning configuration content being received at provisioning server 204, a processor within the provisioning server may determine whether the provisioning content is valid. In an example, the provisioning server 204 may determine if the second provisioning configuration content is valid based on the second public key provided from BMC 212. For example, provisioning server 204 may authenticate a received second public key based on a second private key associated with the second ownership certificate and stored within a memory of the provisioning server. In response to the provisioning content being validated, provisioning server 204 may return signed second provisioning configuration content to BMC 212.

In response to receiving the second signed provisioning configuration content 220, BMC 212 may store second signed provisioning configuration content 220 on top of the first signed provisioning configuration content within memory 214. In response to the second signed provisioning configuration content 220 associated with owner 304 being stored on top of the first signed provisioning configuration content as an overlay in memory 214, the owner may utilize the administrator username and password to perform operations within server 202, to change configurations of the server, or the like. In certain examples, the second signed provisioning configuration content may be automatically applied in any suitable manner including, but not limited to, a zero touch provision. In an example, a zero touch provisioning may result in server 202 being provisioned according to the second provisioning configuration content without interaction from the owner of the server.

In an example, second ownership certificate and hardware inventory profile 230 may be valid only for a specific amount of time. The specific amount of time may be any suitable amount including, but not limited to, years, months, days, and hours. In an example, when second ownership certificate 230 expires, ownership of server 202 may automatically revert back to the previous owner 302 as will be described in greater detail below.

If second ownership certificate 230 has not yet expired, server 202 may be transferred to another owner 306 via an ownership transfer 312. In an example, ownership transfer from owner 304 to owner 306 may be performed in substantially the same manner as described above for ownership transfer 310 from owner 302 to owner 304, such that a third signed provisioning configuration content is overlaid on the second signed provisioning configuration content within memory 214. Thus, for clarity and brevity ownership transfer 310, the configuration of a third certificate, third public key, and third private key will not be described herein, but is performed by BMC 212 and provisioning server 204 as described above for the second certificate, second public key, and second private key. Owner 306 may make additional hardware changes to hardware devices 210 in server 202. For clarity and brevity the hardware configuration and inventory transfer to provisioning server 204 will not be described herein, but is performed by BMC 212 as described for the hardware inventory profile for owner 304. BMC 212 may maintain the hierarchy of the provisioning configuration content 230 within memory 214. Based on the hierarchy, BMC 212 may consider the most recently stored signed provisioning configuration content as the active provisioning configuration content. BMC 212 may lock the provisioning configuration content using any suitable manner including, but not limited to, system lockdown to avoid a configuration drift.

In certain examples, third ownership certificate 230 may be valid only for a specific amount of time, and the amount of time for the third ownership certificate should be less than the expiration of the second ownership certificate. In an example, a timer may be set within BMC 212 for third ownership certificate 230. In response to expiration of the timer, BMC 212 may check the third certificate 230 to determine whether the third certificate has expired.

In response to expiration of the third certificate, BMC 212 may perform one or more operations to revert the ownership of server 202 back to the previous owner, such as owner 304, via an automatic ownership transfer 314. For example, upon expiration of the third certificate, BMC 212 may remove or delete data in memory addresses of memory 214 that store the third signed provisioning configuration content. In an example, the third signed provisioning content may include the hardware configuration profile for owner 306. In response to the top provisioning configuration content being deleted, BMC 212 may automatically apply the next down provisioning configuration content, which is now the most recent provisioning configuration content. In an example, BMC 212 may apply any suitable configuration data for owner 304 including, but not limited to, the second administrator username, the second administrator password, firmware updates, system lockdown, and IP address configurations. The application of the provisioning configuration content 230 associated with the previous owner, such as owner 304, may allow the previous owner to seamlessly claim ownership and have full access to server 202 without any residual data from the delete provisioning content remaining on the server. In this example, automatic ownership transfer 314 may provide the previous owner 304 with full access without owner 304 needing assistance or permission from the expired owner 306.

In certain examples, owner 306 may or may not have installed hardware devices 210 that were in server 202 when ownership of the server was transferred to owner 306. In this situation, in response to the top provisioning configuration content being deleted, BMC 212 may automatically detect hardware devices 210 currently installed within server 202. BMC 212 may retrieve hardware inventory and configuration in the next down provisioning configuration content. BMC 212 may compare the current hardware devices 210 and hardware configurations to the data in the hardware inventory and configuration associated with owner 304. In response to the comparison, BMC 212 may determine whether server 202 has been returned in the same hardware configuration as when transferred to owner 306.

In an example, if BMC 212 determines that the current hardware devices 210 match the hardware devices in the hardware devices in provisioning configuration content 220 associated with owner 304, the BMC may generate a report indicating that the correct hardware inventory for owner 304 is installed within server 202. If BMC 212 determines that one or more hardware devices 210 do not match the hardware devices in the hardware devices in provisioning configuration content 220 associated with owner 304, the BMC may generate a report indicating the hardware changes. In an example, the report may identify hardware devices that have been replaced, removed, added, or the like. For example, the report may indicate that a first DIMM with a first memory size has been replaced with a second DIMM with a second memory size, a NIC has been added to server 202, or the like.

In certain examples, the report may provide any suitable indicators for different hardware changes. For example, if BMC 212 determines that hardware device 210 has been replaced by a legitimate or validated hardware device the report may indicate the replacement but not flag the replacement. In an example, the replacement part may be verified or validated in any suitable manner including, but not limited to, checking the authenticity of replacement hardware device 210 based on an identifier of the replacement hardware device. If BMC 212 determines replacement hardware device 210 as a non-legitimate or unverified device, the BMC may flag or otherwise notify the user of the replacement hardware device. The report may be provided to a user of server 202 in any suitable manner including, but not limited to, a log file and in an electronic mail message.

In an example, second certificate and hardware inventory profile 230 may expired when an amount of time associated with the lease of owner 304. In this situation, automatic ownership transfer 316 may be performed in substantially the same manner as automatic ownership transfer 314. In response to completion of automatic ownership transfer 316, the ownership of server 202 by owner 302 as well as the first ownership certificate may be renewed. In an example, BMC 212 may automatically determine whether a current hardware configuration matches the hardware configuration within provisioning configuration content 220 associated with owner 302.

In an example, hardware device 210 may be a smart NIC, such that hardware device may include a processor to perform a hardware checks. In this example, the NIC may check the hardware configuration for the NIC, for a disk drive, memory, or the like. The NIC may provide the results of the hardware configuration check to BMC 212, which may provide the report to a user of server 202.

In certain examples, a motherboard of server 202 may need to be replaced. In this situation, BMC 212 may store critical data in an external memory attached to the server. The critical data may include, but is not limited to, the provisioning configuration content hierarchy, stored certificates, and stored public and private keys. The external memory may be any suitable memory, such as a memory in a display panel attached to server 202. When a new motherboard is connected, BMC 212 may retrieve the critical data and restore this data in memory 214.

In an example, new BMC 212 may be hard coded to perform one or more operations to synchronize provisioning configuration content 220 in memory 214 with content in provisioning server 204. For example, new BMC 212 may include a serial tag to identify server 202, and the new BMC may provide the serial tag to provisioning server 204. In response to the serial tag, provisioning server 204 may provide provisioning configuration content 220 associated with server 202 to new BMC 212, which in turn may store the provisioning configuration content in memory 214. In an example, provisioning server 204 may be a local server, such as a server within the same server rack or data center as server 202. In another example, provisioning server 204 may be a remote server, such as a dynamic host configuration protocol (DHCP) server. In this example, BMC 212 may provide provisioning server 204 an Internet Protocol (IP) address and identifier for server 202. The IP address and identifier for server 202 may enable provisioning server 204 to properly identify server 202 and provide provisioning configuration content 220 to BMC 212.

Figure 4:
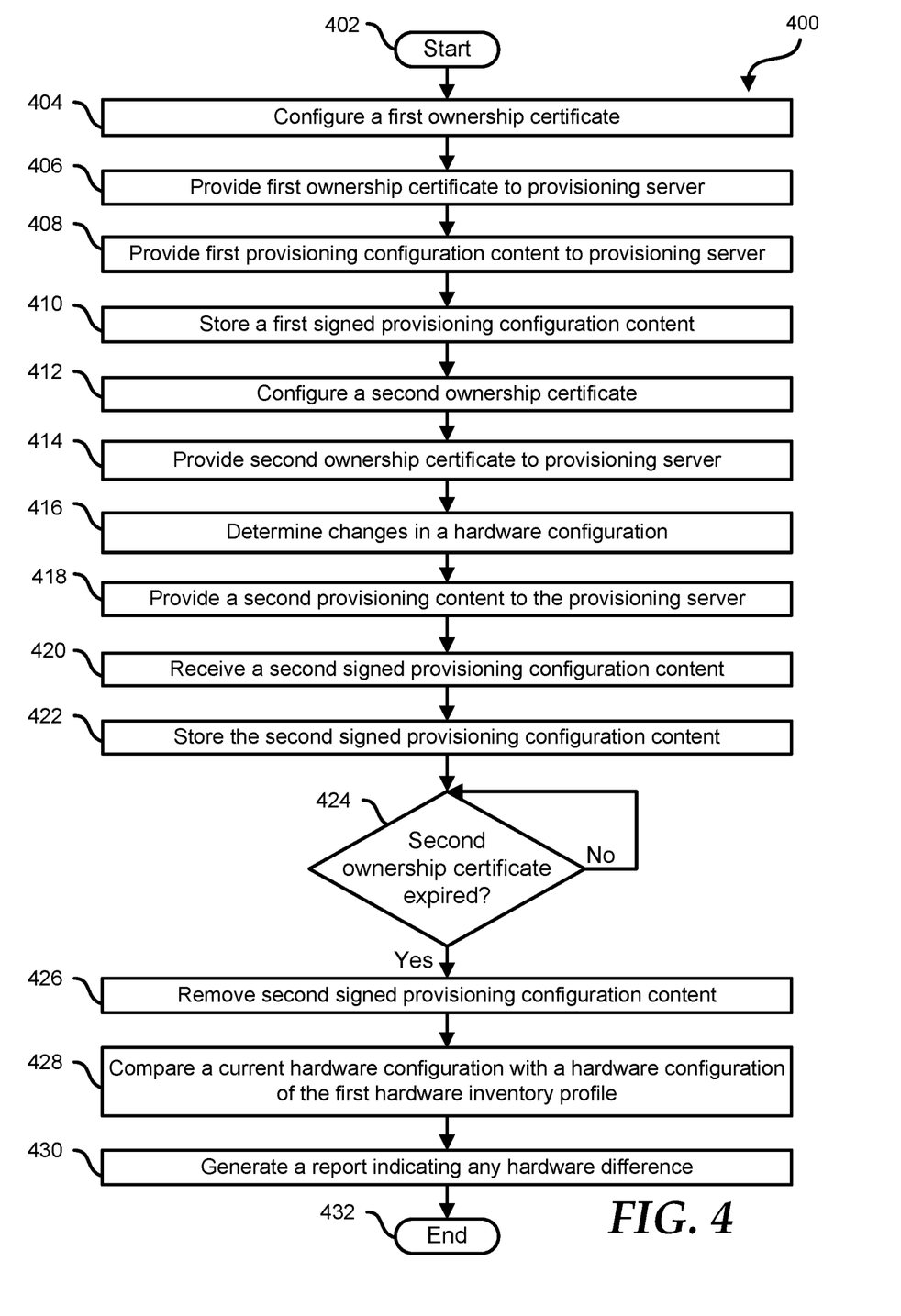
FIG. 4 is a flow diagram of a method for overlaying ownership certificates having associated hardware inventory profiles to track hardware inventories among owners of an information handling system according to at least one embodiment of the current disclosure.

FIG. 4 illustrates a method 400 for overlaying ownership certificates having associated hardware inventory profiles to track hardware inventories among owners of an information handling system according to at least one embodiment of the current disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 1.

At block 404, a first ownership certificate is configured. At block 406, the first ownership certificate is provided to a provisioning server. In an example, the ownership certificate may be provided to the provisioning server via any suitable means including, but not limited to, an encrypted communication over a network. In certain example, the first ownership certificate may be utilized to register a first owner as the owner of the server.

At block 408, first provisioning configuration content is provided to the provisioning server. In certain examples, first provisioning configuration content for the server may be provided with the first ownership certificate to the provisioning server. The first provisioning configuration content may contain any suitable data including, but not limited to, a list of user configurations, administrator username and password, hardware device configuration details, IP address, software configuration details, firmware update details, and a first hardware inventory profile. In an example, the first hardware inventory profile may include any suitable data for the hardware of the server including, but not limited to, a list of hardware devices within the server. The list of hardware devices may include a type of device, a serial number for the device, or the like. In an example, a processor of the server may encode the first provisioning configuration content using a private key of the first ownership certificate.

At block 410, first signed provisioning configuration content is received and stored. In certain examples, the provisioning server may validate the first provisioning configuration content in any suitable manner. For example, the provisioning server may utilize the public key associated with the first ownership certificate to validate the first provisioning configuration content. In response to the first provisioning configuration content being validated, the provisioning server may sign the first provisioning configuration content prior to sending the content back to the server. In an example, the first signed provisioning configuration content is stored in a memory. In an example, the memory may be any suitable encrypted memory including, but not limited to, a credential vault memory or memory location.

At block 412, a second ownership certificate is configured. At block 414, the second ownership certificate is provided to a provisioning server. In an example, the ownership certificate may be provided to the provisioning server via any suitable means including, but not limited to, an encrypted communication over a network. In an example, a second owner of the server may utilize the second ownership certificate to transfer ownership from the first owner to the second owner. In certain examples, the server may receive second signed provisioning configuration content from the provisioning server. The second signed provisioning configuration content is stored in the memory. In an example, the second signed provisioning configuration content may be stored as an overlay on the first signed provisioning configuration content, such that the second signed provisioning configuration content is the active content. The memory may be located with a BMC of the server.

At block 416, changes in a hardware configuration of the server are detected. In an example, the changes in the hardware configuration may be made by the second owner of the server. The second owner may change the hardware configuration in any suitable manner including, but not limited to, replacing hardware devices, removing hardware devices, and adding additional hardware devices. The changes to the hardware devices may be stored as a second hardware configuration.

At block 418, second provisioning configuration content is provided to the provisioning server. In certain examples, second provisioning configuration content for the server may be provided with the second ownership certificate to the provisioning server. The second provisioning configuration content may contain any suitable data including, but not limited to, a list of user configurations, administrator username and password, hardware device configuration details, IP address, software configuration details, firmware update details, and a second hardware inventory profile. In an example, the second hardware inventory profile may include any suitable data for the hardware of the server including, but not limited to, a list of hardware devices within the server. The list of hardware devices may include a type of device, a serial number for the device, size or capacity, or the like. In an example, a processor of the server may encode the second provisioning configuration content using a private key of the second ownership certificate.

At block 420, second signed provisioning configuration content is received and stored. In certain examples, the provisioning server may validate the second provisioning configuration content in any suitable manner. For example, the provisioning server may utilize the public key associated with the second ownership certificate to validate the second provisioning configuration content. In response to the second provisioning configuration content being validated, the provisioning server may sign the second provisioning configuration content prior to sending the content back to the server. In an example, the second signed provisioning configuration content is stored in the memory. The memory may be any suitable encrypted memory including, but not limited to, the credential vault memory or memory location. In certain examples, the second signed provisioning configuration content may be stored as an overlay on the first signed configuration content.

At block 424, a determination is made whether the second ownership certificate has expired. In an example, the expiration of the second ownership certificate may be based on a specific amount of time of a lease. The specific amount of time may be any suitable amount including, but not limited to, years, months, days, and hours. When the second ownership certificate has expired, the second signed provisioning configuration content is removed at block 426. At block 428, the first signed provisioning configuration content is applied and a comparison is performed between the current hardware configuration profile and the first hardware configuration profile. In an example, the first signed provisioning configuration content may be applied as any suitable configuration data including, but not limited to, the administrator username, the administrator password, firmware updates, system lockdown, and IP address configurations. The application of the provisioning configuration content associated with the previous owner may allow the previous owner to seamlessly claim ownership and have full access to the server without any residual data from the delete provisioning content remaining on the server. In this example, the automatic ownership transfer may provide the previous owner with full access without the renewed owner needing assistance or permission from the expired owner, and may enable the first owner to be notified of any hardware changes. At block 430 a report indicating any hardware differences is generated, and the flow ends at block 432. The report may indicate whether the server has been returned in the same hardware configuration, or if hardware changes have been made. If hardware changes have been made, the report may include in any suitable information including, but not limited to, hardware devices that have been replaced, hardware devices that have been removed without a replacement, and hardware devices that have been added to the server.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a provisioning server; and
a server including a baseboard management controller, the baseboard management controller to:
determine a first hardware inventory profile for the server;
provide the first hardware inventory profile to the provisioning server, wherein the first hardware inventory profile is included within first provisioning configuration content;
store first signed provisioning configuration content, wherein the first signed provisioning configuration content is based on a first ownership certificate for a first owner of the server, wherein the first signed provisioning configuration content is stored in an encrypted memory;
determine a second hardware inventory profile for the server;
provide the second hardware inventory profile to the provisioning server, wherein the second hardware inventory profile is included within second provisioning configuration content;

store second signed provisioning configuration content, wherein the second signed provisioning configuration content is based on a second ownership certificate for a second owner of the server;

lock the second signed provisioning configuration content on top of the first signed provisioning configuration content in the encrypted memory; and in response to an expiration of the second ownership certificate:

remove the second signed provisioning configuration content;

compare a current hardware inventory profile for the server to the first hardware inventory profile; and generate a report to indicate any hardware changes between the current hardware inventory profile and the first hardware inventory profile.

2. The information handling system of claim 1, wherein the indication of hardware changes includes the baseboard management controller further to include a replacement hardware device in the report without flagging the replacement hardware device when the replacement hardware device is a verified device.

3. The information handling system of claim 1, wherein the baseboard management controller further to flag unidentified hardware devices in the report.

4. The information handling system of claim 1, wherein the baseboard management controller further to embed the first hardware inventory profile and the first provisioning configuration content within the first ownership certificate.

5. The information handling system of claim 4, wherein the baseboard management controller further to encode the first provisioning configuration content with a private key of the first ownership certificate, and to provide the encoded first provisioning configuration content to the provisioning server.

6. The information handling system of claim 1, wherein prior to the removal of the second signed provisioning configuration content, the baseboard management controller to unlock the second signed provisioning configuration content.

7. A method comprising:
determining, by a baseboard management controller of a server, a first hardware inventory profile for the server;
providing the first hardware inventory profile to the provisioning server, wherein the first hardware inventory profile is included within first provisioning configuration content;
storing first signed provisioning configuration content, wherein the first signed provisioning configuration content is based on a first ownership certificate for a first owner of the server, wherein the first signed provisioning configuration content is stored in an encrypted memory;
determining a second hardware inventory profile for the server;
providing the second hardware inventory profile to the provisioning server, wherein the second hardware inventory profile is included within second provisioning configuration content;
storing second signed provisioning configuration content, wherein the second signed provisioning configuration content is based on a second ownership certificate for a second owner of the server;
locking the second signed provisioning configuration content on top of the first signed provisioning configuration content in the encrypted memory; and in response to an expiration of the second ownership certificate:
removing the second signed provisioning configuration content;
comparing a current hardware inventory profile for the server to the first hardware inventory profile; and
generating a report to indicate any hardware changes between the current hardware inventory profile and the first hardware inventory profile.

8. The method of claim 7, wherein the indicating of hardware changes, the method further comprises:
including a replacement hardware device in the report without flagging the replacement hardware device when the replacement hardware device is a verified device.

9. The method of claim 7, further comprising:
flagging unidentified hardware devices in the report.

10. The method of claim 7, further comprising:
embedding the first hardware inventory profile and the first provisioning configuration content within the first ownership certificate.

11. The method of claim 10, further comprising:
encoding the first provisioning configuration content with a private key of the first ownership certificate; and
providing the encoded first provisioning configuration content to the provisioning server.

12. The method of claim 7, prior to the removing of the second signed provisioning configuration content, the method further comprising:
unlocking the second signed provisioning configuration content.

13. A method comprising:
determining, by a first baseboard management controller of a server, a first hardware inventory profile for the server;
providing the first hardware inventory profile to the provisioning server, wherein the first hardware inventory profile is included within first provisioning configuration content;
storing first signed provisioning configuration content, wherein the first signed provisioning configuration content is based on a first ownership certificate for a first owner of the server, wherein the first signed provisioning configuration content is stored in an encrypted memory;
providing a second hardware inventory profile for the server to the provisioning server, wherein the second hardware inventory profile is included within second provisioning configuration content;
storing second signed provisioning configuration content, wherein the second signed provisioning configuration content is based on a second ownership certificate for a second owner of the server;
locking the second signed provisioning configuration content on top of the first signed provisioning configuration content in the encrypted memory;
synchronizing, by a second baseboard management controller, the first and second signed provisioning configuration contents with the provisioning server, wherein the first baseboard management controller is replaced by the second baseboard management controller in the server; and
in response to an expiration of the second ownership certificate:
removing, by the second baseboard management controller, the second signed provisioning configuration content;

comparing a current hardware inventory profile for the server to the first hardware inventory profile; and generating, by the second baseboard management controller, a report to indicate any hardware changes between the current hardware inventory profile and the first hardware inventory profile.

14. The method of claim 13, wherein the indicating of hardware changes, the method further comprises:

including a replacement hardware device in the report without flagging the replacement hardware device when the replacement hardware device is a verified device.

15. The method of claim 13, further comprising:

flagging unidentified hardware devices in the report.

16. The method of claim 13, further comprising:

embedding the first hardware inventory profile and the first provisioning configuration content within the first ownership certificate.

\* \* \* \* \*